(12) United States Patent
Ross et al.

(10) Patent No.: US 8,331,210 B2
(45) Date of Patent: Dec. 11, 2012

(54) SYSTEM AND METHOD FOR STORAGE OF DATA IN CIRCULAR DATA TRACKS ON OPTICAL DISCS

(75) Inventors: John Anderson Fergus Ross, Niskayuna, NY (US); Kenneth Brakeley Welles, Scotia, NY (US); John Erik Hershey, Ballston Lake, NY (US); Nick Andrew Van Stralen, Bloomfield, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 938 days.

(21) Appl. No.: 12/342,794

(22) Filed: Dec. 23, 2008

(65) Prior Publication Data

US 2010/0157757 A1    Jun. 24, 2010

(51) Int. Cl.
*G11B 7/00* (2006.01)
(52) U.S. Cl. ........................ 369/103; 369/47.2
(58) Field of Classification Search .................. 369/103, 369/44.41, 47.27, 53.32, 53.33, 47.21, 47.19, 369/47.17, 47.18, 47.2
See application file for complete search history.

(56) References Cited

U.S. PATENT DOCUMENTS

| | | | | |
|---|---|---|---|---|
| 5,031,168 A * | 7/1991 | Moore | ........................ | 369/59.25 |
| 5,450,218 A | 9/1995 | Heanue et al. | | |
| 5,473,621 A * | 12/1995 | Wei | ............................... | 714/784 |
| 5,510,912 A | 4/1996 | Blaum et al. | | |
| 5,608,713 A * | 3/1997 | Akagiri et al. | ........... | 369/124.08 |
| 5,727,226 A | 3/1998 | Blaum et al. | | |
| 5,808,998 A | 9/1998 | Curtis et al. | | |
| 5,917,798 A * | 6/1999 | Horimai et al. | ................ | 369/103 |
| 6,175,317 B1 | 1/2001 | Ordentlich et al. | | |
| 6,484,285 B1 * | 11/2002 | Dent | ............................. | 714/791 |
| 6,549,664 B1 | 4/2003 | Daiber et al. | | |
| 6,563,779 B1 | 5/2003 | McDonald et al. | | |
| 6,614,741 B1 * | 9/2003 | Hesselink et al. | ............. | 369/103 |
| 6,691,275 B1 * | 2/2004 | Jaeckel | ......................... | 714/752 |
| 6,711,711 B2 * | 3/2004 | Hwang | ......................... | 714/792 |
| 6,738,322 B2 | 5/2004 | Amble et al. | | |
| 6,889,907 B2 | 5/2005 | Roh | | |
| 6,980,607 B2 * | 12/2005 | Becker et al. | ................. | 375/341 |
| 7,020,054 B2 | 3/2006 | Kadlec et al. | | |

(Continued)

OTHER PUBLICATIONS

Error-Trellises for Convolutional Codes, Part I: Construction Ariel and Snyders, IEEE Transactions of Communications, vol. 46, No. 12, Dec. 1998, pp. 1592-1601.*

(Continued)

*Primary Examiner* — Nabil Hindi
(74) *Attorney, Agent, or Firm* — Jean Testa; Fletcher Yoder

(57) ABSTRACT

The present techniques provide methods and systems for reading and processing a data signal read from an optical data disc. In embodiments, an optical reader system may read data bits from a data ring in the disc. The data rings may be concentric, and a beginning of a sequence of data on the data ring may be in substantially the same position as an ending of the sequence. The reader may identify a data ring and begin the read process on the targeted data ring, and may end the read process when the reader reaches the starting point. The data sequence read from the data ring may be decoded to form a bit stream, which may be provided to various output devices. A circular trellis formed from the bit stream may enable the reading of a targeted data sequence without additional tail bits to improve data transmission efficiency.

28 Claims, 6 Drawing Sheets

U.S. PATENT DOCUMENTS

| | | | |
|---|---|---|---|
| 7,170,661 B2* | 1/2007 | Ogasawara et al. | 359/22 |
| 7,388,695 B2 | 6/2008 | Lawrence et al. | |
| 7,944,794 B2* | 5/2011 | Fujita et al. | 369/103 |
| 8,089,846 B2* | 1/2012 | Hershey et al. | 369/103 |
| 8,125,862 B2* | 2/2012 | Ross et al. | 369/44.41 |
| 2005/0136333 A1 | 6/2005 | Lawrence et al. | |
| 2006/0073392 A1 | 4/2006 | Erben et al. | |
| 2006/0078802 A1 | 4/2006 | Chan et al. | |
| 2006/0291360 A1* | 12/2006 | Maeda et al. | 369/53.23 |
| 2007/0097469 A1 | 5/2007 | Erben et al. | |
| 2007/0146835 A1 | 6/2007 | Erben et al. | |
| 2008/0055686 A1 | 3/2008 | Erben et al. | |
| 2008/0133999 A1* | 6/2008 | Kondo et al. | 714/755 |
| 2008/0144145 A1 | 6/2008 | Boden et al. | |
| 2008/0144146 A1 | 6/2008 | Boden et al. | |

OTHER PUBLICATIONS

Error-Trellises for Convolutional Codes, Part II: Decoding Methods Ariel and Snyders, IEEE Transactions on Communications, vol. 47, No. 7, Jul. 1999, pp. 1015-1024.*

Anderson and Hladik, Tailbiting MAP decoders, IEEE Journal on Selected Areas in Communications, vol. 16, No. 2, Feb. 1998 pp. 297-302.*

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

Steinbuch, Maarten et al., Limits of Implementation: a CD Player Control Case Study, Proceedings of the American Control Conference, Baltimore, Maryland, Jun. 1994, pp. 3209-3213, Article No. FP2—5:00.

U.S. Appl. No. 12/343,204, filed Dec. 23, 2008, Ruediger Kusch.

U.S. Appl. No. 12/346,279, filed Dec. 30, 2008, Victor Ostroverkhov et al.

U.S. Appl. No. 12/346,378, filed Dec. 30, 2008, Xiaolei Shi et al.

U.S. Appl. No. 12/347,178, filed Dec. 31, 2008, Victor Ostroverkhov et al.

U.S. Appl. No. 12/347,211, filed Dec. 31, 2008, Xiaolei Shi et al.

U.S. Appl. No. 12/336,399, filed Dec. 16, 2008, John Erik Hershey et al.

U.S. Appl. No. 12/336,414, filed Dec. 16, 2008, John Anderson Fergus Ross et al.

U.S. Appl. No. 12/336,457, filed Dec. 17, 2008, John Anderson Fergus Ross et al.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

* cited by examiner

US 8,331,210 B2

SYSTEM AND METHOD FOR STORAGE OF DATA IN CIRCULAR DATA TRACKS ON OPTICAL DISCS

BACKGROUND

The invention relates generally to bit-wise holographic data storage techniques. More specifically, the technique relates to methods and systems for reducing optical disc reading time using circular coding techniques.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disc, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disc, or 50 GB in a dual-layer disc. As resolution of video displays, and other technologies, continue to develop, storage media with ever-higher capacities will become more important. One developing storage technology that may meet the capacity requirements for some time to come is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data, typically a plurality of bits, is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or reflection grating, typically generated by two counter propagating focused recording beams. The data is then retrieved by using a read beam to diffract off the micro-hologram to reconstruct the recording beam. Accordingly, micro-holographic data storage is more similar to current technologies than page-wise holographic storage. However, in contrast to the two layers of data storage that may be used in DVD and Blu-ray Disc™ formats, holographic discs may have 50 or 100 layers of data storage, providing data storage capacities that may be measured in terabytes (TB).

Although optical storage systems may provide much higher storage capacities than other storage systems, the higher storage capacities may make reading speed of data from discs a problem. Accordingly, improvements that increase the reading speed may be advantageous.

BRIEF DESCRIPTION

A contemplated embodiment of the present techniques provides a method for reading data on an optical disc. The method includes reading a sequence of bits from a data ring on the optical disc, decoding the sequence of bits to form a bit stream, and providing the bit stream to an output device. In reading the sequence of bits, the beginning position of the sequence may be substantially the same as the ending position of the sequence.

Another contemplated embodiment provides a reader for optical data discs. The reader includes an optical excitation device, an optical detector, a decoder, and an output device. The optical excitation device is configured to focus a laser beam on a data disc, which includes a sequence of bits written in a data ring, and the optical detector is configured to detect reflections of the beam from the sequence of bits and form a signal comprising a bit stream of the reflections from the sequence of bits. The decoder is configured to analyze this bit-stream for a circular tail-biting code, and further assemble a decoded bit-stream from the analyzed bit-stream. The output device then provides the decoded bit-stream to an external device.

Yet another contemplated embodiment provides an optical storage disc. The optical storage disc includes a recording surface which has a data ring containing optical variations representing data bits. The data bits in this data ring are encoded with a circular tail-biting code configured to allow decoding of substantially all the data bits in the data ring from approximately one complete revolution of the data ring.

In another contemplated embodiment, the present techniques provide a method for storing data on a data disc. The method includes encoding a bit sequence with a tail-biting circular code (TCC) to form a TCC data stream, parsing the TCC data stream into separate bit patterns of equal length, selecting symbols based on the bit patterns, and storing the symbols in a data ring on the data disc.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
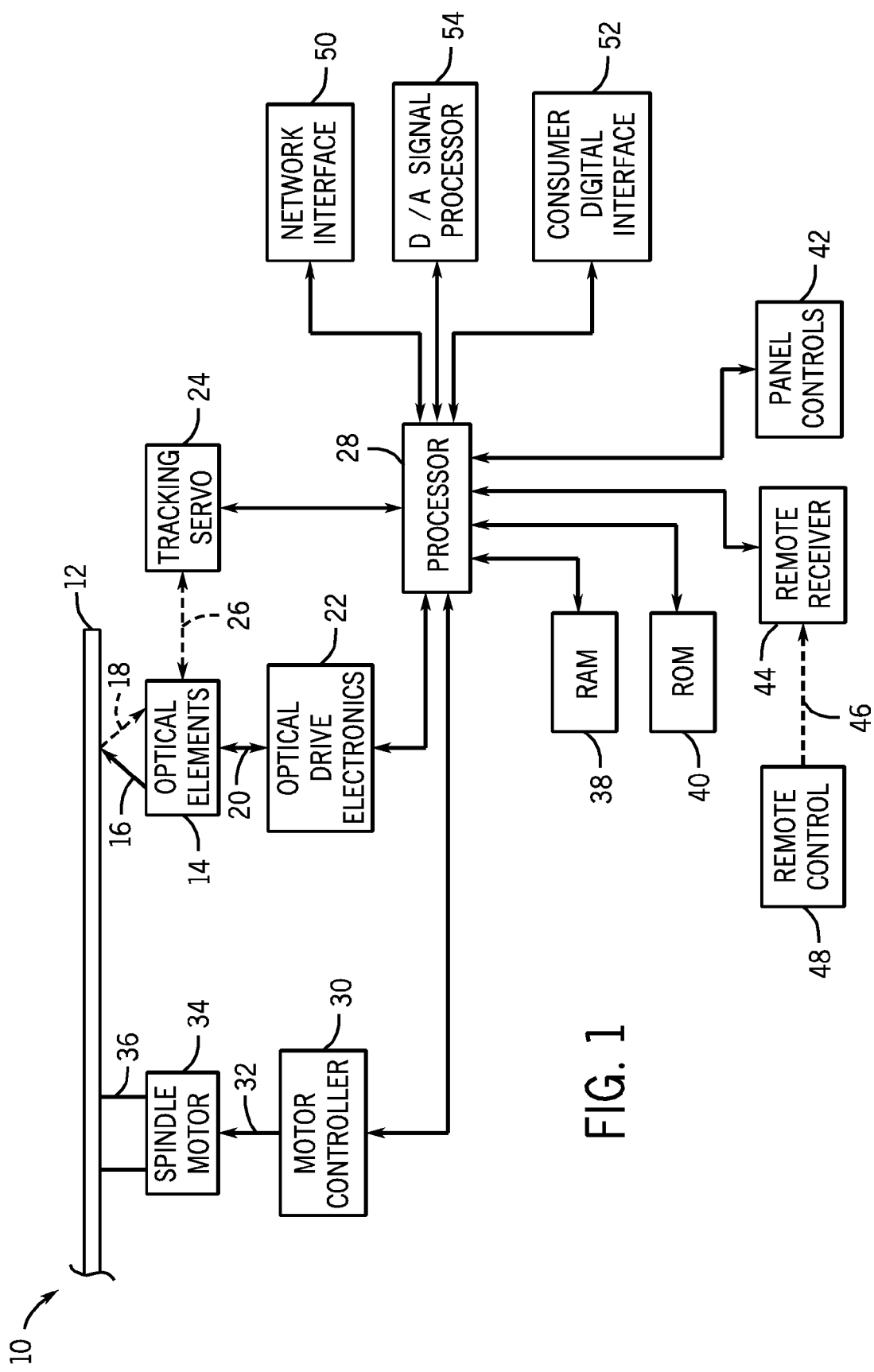
FIG. 1 is a schematic diagram of an optical disc reader, in accordance with embodiments of the present technique.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Data in a holographic storage system is typically stored within a photosensitive optical material using an optical interference pattern that allows data bits to be stored throughout the volume of the optical material. Holographic storage systems may improve data transfer rates, as millions of bits of holographic data may be written and read in parallel. Furthermore, multilayer recording in holographic storage systems may increase storage capacity by storing holographic data in multiple layers of an optical disc. As previously described, data may be written by directing a recording beam (e.g., a laser) to a holographic storage system and focusing the beam at a certain depth, on a particular layer of information. The laser may also be focused on a selected point or position on the selected layer. The laser generates a photochemical change at the position where the laser is focused, thereby writing the data.

To read data in a multilayer holographic storage system, a reading beam may be directed to a data bit position at a particular layer in an optical disc, and the interaction of the reading beam at the data bit position may generate a reconstructed data beam corresponding to an initial recording beam. For example, the reading beam may be reflected from a holographic data bit, and this reflected data beam may be proportional to the initial recording beam that wrote the holographic data bit. The reflected data beam, or the data signal, may be received at a detector, and the detector and other devices in an optical reading system may process the data signal, which may include decoding the data signal, correcting bit-state errors, and assembling the data signal into a bit-stream to be output from the optical reading system.

In typical optical disc reading systems, data in the optical disc is arranged along spiral tracks, and to read a particular data sequence, the reading device may begin reading at a start of the data sequence. Generally, in encoding a data sequence, a number of information bits may create a codeword. To read a particular data sequence, a decoding device may typically start at a codeword boundary, which is the bit location at which the codeword begins. Thus, in conventional systems, the decoding device must know the location of the codeword boundary in order to identify the data sequence that is to be read or decoded, and furthermore, must start reading at the correct location. This may be referred to as codeword synchronization. Failure to start at the correct location on the optical disc may lead to inefficiencies or inaccuracies in the read process.

One method typically used to achieve codeword synchronization and identify the codeword boundary may be to insert a physical marker between codewords in a data track. For example, this physical marker may be a known bit sequence that is recognized by the decoding device as the bit sequence directly preceding a target data sequence. However, adding this physical marker may require the transmittal of more bits, which may lower the efficiency of the read process. The read process may be further slowed, as the read system must search for a physical location on the optical disc to commence reading. Furthermore, any errors in the physical marker may prevent the reading system from recognizing the marker and reading the targeted data sequence from the codeword boundary. Though some systems may use error correction schemes to address errors resulting from unrecognizable markers, the error correction sequence adds even more bits to the marker, and the transmission rate may be further reduced.

The present technique is directed to improving the signal processing system in an optical storage system by implementing a plurality of individual data tracks configured in concentric rings in an optical disc, and a reading system configured to read and decode data read from the data rings. As will be further explained, the reading system may enable the use of rotationally invariant code in processing data signals from optical discs that have data rings on a data layer. As used herein, a data ring may refer to a track of data bit positions arranged in ring on a data layer, where each data ring may be traced, starting from any data bit position on the data ring, along the data bit positions of the data ring track, and end at the same starting data bit position. A data bit position may refer to a position where a data bit may be written. A data bit may be written by changing the state of the bit (e.g., a "1" state or a "0" state), and may also be referred to as a micro-hologram or a micro-reflector in an optical disc or a holographic optical disc. In embodiments, the presence or absence of a micro-reflector may indicate different bit states. Furthermore, the holographic storage systems described herein are merely examples of embodiments of the present techniques. The present techniques may apply to any other optical storage system using pits and lands for data storage, and may include DVDs, Blu-Ray™ disks, and the like.

A data layer in the holographic disc may include multiple concentrically arranged data rings. The rotationally invariant code, also referred to as tail-biting code or circular code, may enable a more efficient reading of data in circular media. A detector may read a data ring and receive a signal containing the targeted data sequence regardless of the start location where the detector begins reading on the data ring. More specifically, a targeted data sequence may be contained in a data ring, and because the data in each data ring is arranged in one complete circle, the detector may start reading at any point on the ring and end at substantially the same point on the ring, and somewhere between the start and end of the data ring, the detector will have read the targeted data sequence. The data read from this data ring may make up a circular trellis from where the target data sequence may be obtained. Thus, a reader system may electronically locate a target data sequence in the data sequence of a data ring. Locating a target data sequence electronically from a processed data sequence may be faster and/or more efficient than physically locating a start position of the target data sequence on an optical disc.

To read optical discs with data rings in accordance with the embodiments of the present techniques, the starting position of a target data sequence does not have to be known by the optical reading system. As a decoding device may start at any position along a data ring to properly read and decode a data sequence, embodiments of the present techniques may eliminate inefficiencies or problems with codeword synchronization. Since the starting position need not be known, physical markers typically used to identify the codeword boundary, or to indicate the start of a data sequence, may not be necessary. Data transmission efficiency may be increased, as the optical reading system need not physically locate a physical marker, and need not transmit the extra bits of the physical markers. Furthermore, reading problems may be reduced, as the decoding errors resulting from errors in the physical markers may also be eliminated.

Embodiments of the present techniques may apply to various media capable of storing data along data rings, or concentric and individual circular data tracks, and various reading systems capable of reading the media with data stored in data rings. Embodiments of the present technique may include an optical disc and a reading system configured to read data rings from the optical disc. An optical disc may have multiple data rings. For example, the data rings may be arranged in concentrically on a layer of an optical disc, and an optical disc may further have more than one layer.

Turning now to the figures, FIG. 1 is an optical reader system 10 that may be used to read data from optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The reflected beam 18 may include some combination of light reflected from a micro-hologram on the optical storage disc 12, light reflected from a surface of the optical storage disc 12, and some interaction of the light reflected from the micro-hologram and the light reflected from the surface. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 are controlled by a processor 28. In some embodiments in accordance with the present techniques, the processor 28 may be capable of determining the position of the optical elements 14, based on sampling information which may be received by the optical elements 14 and fed back to the processor 28. The position of the optical elements 14 may be determined to enhance and/or amplify the reflection 18 or to reduce interferences of the reflection 18. In some embodiments, the tracking servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
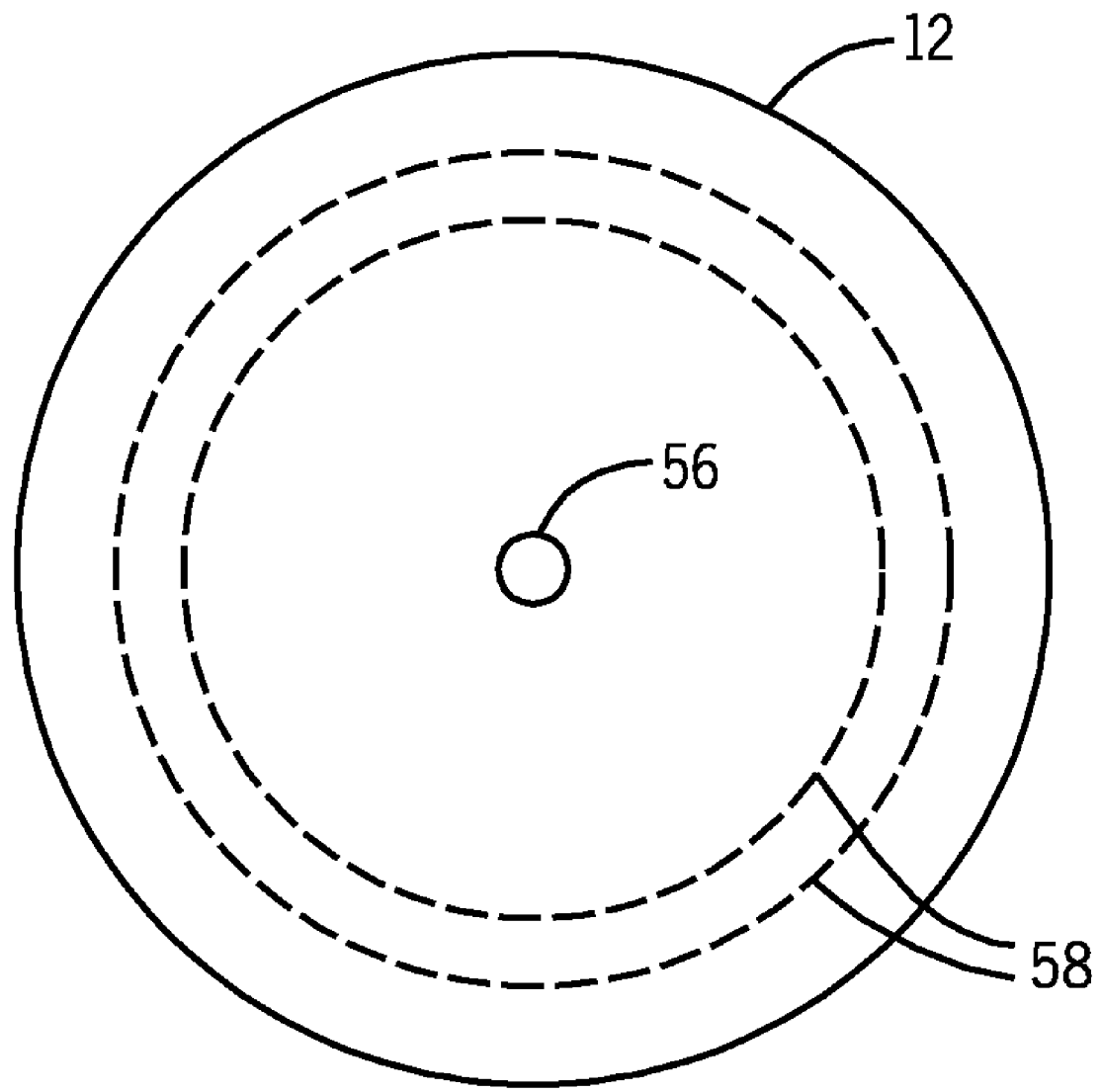
FIG. 2 is a top view of an optical disc that may be used in embodiments of the present techniques.

The reader 10 may be used to read an optical data disc 12 containing data as shown in FIG. 2. Generally, the optical data disc 12 is a flat, round disc with one or more data storage layers embedded in a transparent protective coating. The protective coating may be a transparent plastic, such as polycarbonate, polyacrylate, and the like. The data layers may include any number of surfaces that may reflect light, such as the micro-holograms used for bit-wise holographic data storage or a reflective surface with pits and lands. A spindle hole 56 couples to the spindle (e.g., the spindle 36 of FIG. 1) to control the rotation speed of the disc 12. Each layer may include data tracks arranged in data rings 58. For example, there may be a plurality of substantially concentric and circular data rings 58 on each data layer of the optical data disc 12.

Figure 3:
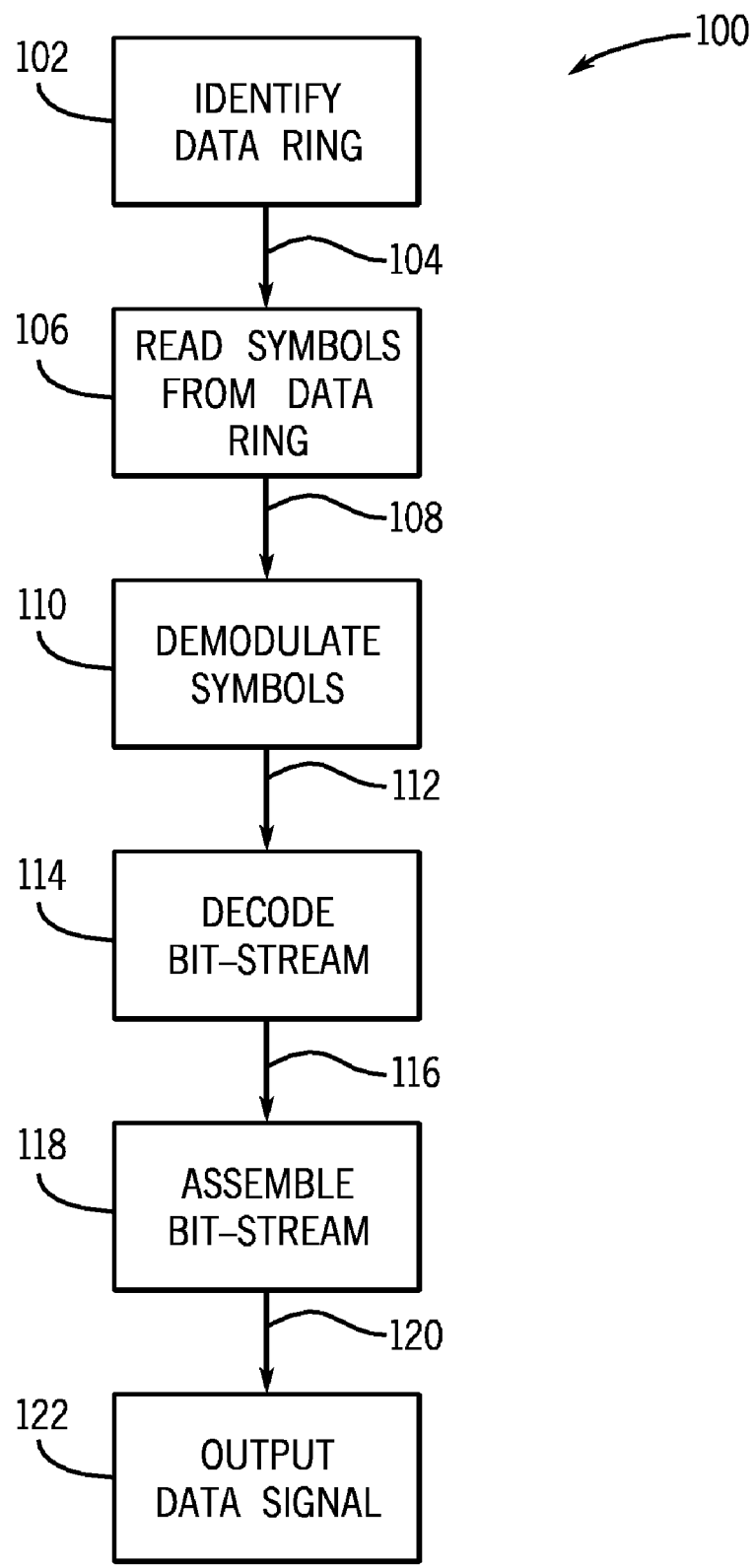
FIG. 3 is a block diagram illustrating a general procedure for processing a bit or bits of data read from an optical disc, in accordance with embodiments of the present techniques.

An example of a procedure 100 that may be used to read an optical data disc 12 in accordance with embodiments of the present technique is shown in the flow chart of FIG. 3. The procedure 100 begins with identifying the data ring which contains the target data sequence, as indicated in block 102. Because the data rings of the optical disc 12 are arranged in a complete circular shape, the reader 10 may begin reading at any position on a data ring containing the target data sequence and finish reading at substantially the same position on the target data ring. Once the reader 10 identifies the target data ring 104, data symbols on the target data ring 104 are read, as indicated in block 106. The plurality of bits 108 are then provided to a demodulator. A demodulator in the reader 10 may demodulate the plurality of bits (block 110), which may have been modulated through, for example, eight-to-fourteen modulation (EFM), used in modulating CDs, EFM+, used to modulate DVDs, or by the 17PP system, used to modulate Blu-Ray discs. A demodulated bit stream 112 may be produced by the demodulator.

In some embodiments of the present technique, a tail-biting code may be implemented. A tail-biting code may also be referred to as a circular code, as the start state of a convolutional encoder is configured to coincide with the end state, and a codeword in a circular track has an end which is connected to its beginning. Because a circular codeword has an end connected to its beginning, no additional tail bits are required to indicate the end of a data sequence. Further, the set of all codewords may create a circular trellis, meaning that the starting state of a convolutional encoder may also be the ending state. Thus, any sequence of data, or any codeword in the circular trellis may be a valid codeword. The reader 10 may begin reading a data ring at any bit, or any codeword of the data track.

The demodulated data sequence 112 may be decoded (block 114). For example, in one embodiment, a maximum a posteriori (MAP) decoder may be used in decoding (block 114) the demodulated data sequence 112. Decoding may remove redundant bits, which may be associated with the tail-biting code which merges when a reader 10 reaches the starting point on the data ring. Additionally, redundant bits may result from any number of error correction codes, including Reed-Solomon encoding, feed-forward convolutional codes, recursive convolutional codes, circular codes, Viterbi codes, bit-error rate minimizing code, and the like. The redundant bits may further be used to correct at least some of the errors that may have occurred during the reading process. A demodulated and decoded bit-stream 116 may be assembled, as indicated in block 118, producing a data signal 120 which may be provided to an output device, as indicated in block 122. The data signal 120 may be a digital signal before it is provided to the output device, or the data signal 120 may pass through a digital-to-analog converter to be provided as an analog signal to the output device. Output devices may include those discussed with respect to FIG. 1, the network interface 50, the consumer digital interface 52, or the digital-to-analog signal processor 54, or any combinations thereof.

Figure 4:
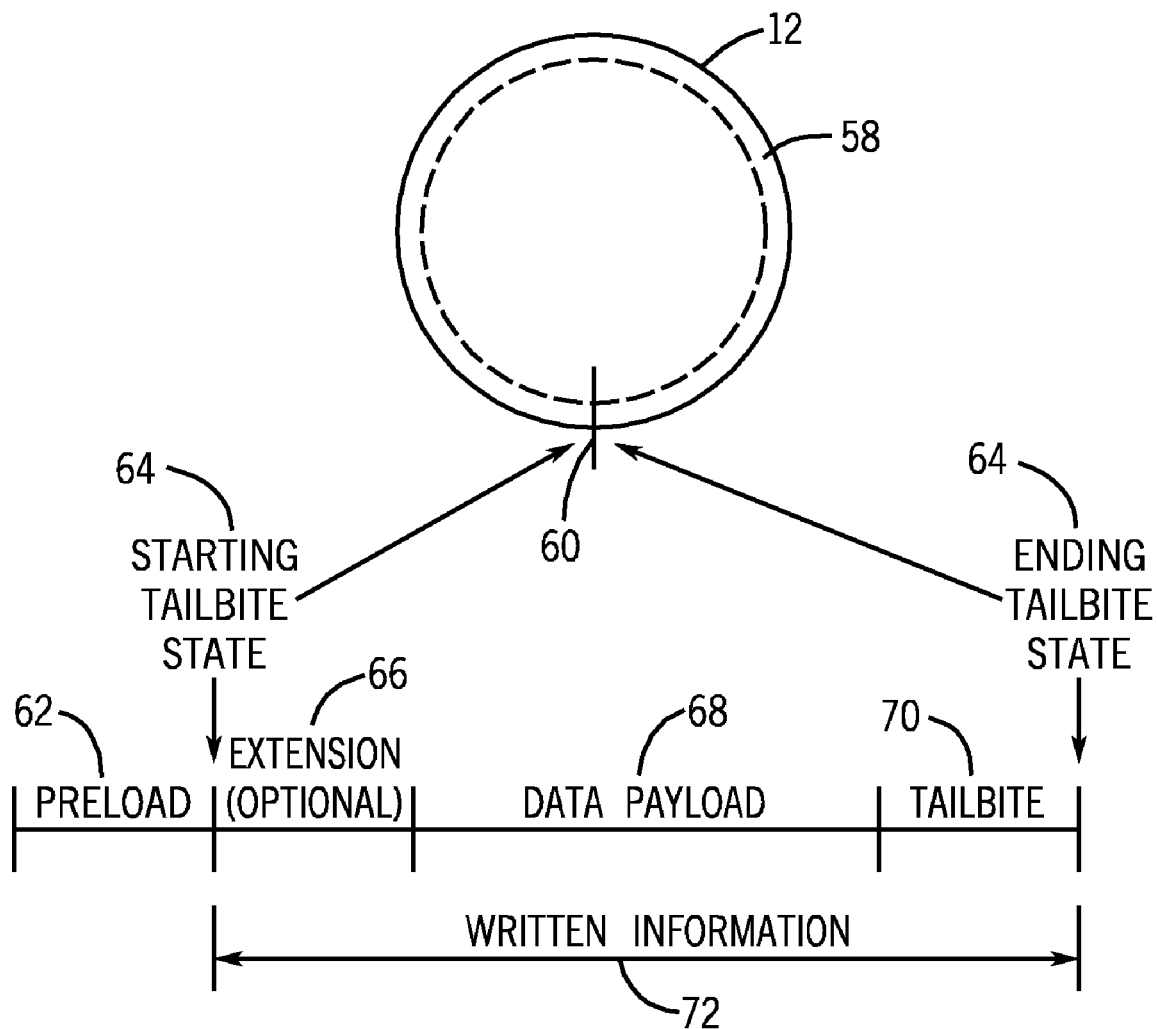
FIG. 4 depicts a data sequence read from a data ring in an optical disc, in accordance with embodiments of the present techniques.

One example of the decoding process in reading a data ring in accordance with embodiments of the present technique is depicted in FIG. 4. The reader 10 (as in FIG. 1) may begin reading a data ring 58 on the optical disc 12 at any start point 60. The data or bits in the data ring 58 may be encoded with a tail-biting code, or a circular code, such that the reader 10 may read a data sequence along the complete track of the data ring 58. The tail-biting code may enable a reading of a data ring where the ending tail-bite state 64 is the same as the starting tail-bite state 64. Further, the circular codeword, or the codeword of the start point 60, may also be the end point of the reading such that additional tail bits are not necessary to mark the end of a data sequence. The data sequence read from the data ring 58 may include a data payload 68, any data extensions 66, and a tail-bite 70. These three elements 68, 66, and 70 may be produced from a decoder as written information 72. The data payload 68 may refer to a target data sequence, and may contain, for example, user data. The extensions 66 may be optional and may refer to data accompanying the data payload 68, or data which enables the data payload 68 in an output device. The tail-bite 70 may refer to the codeword where the reader 10 begins reading, as any start point 60 may also be an end point when reading data rings in accordance with the present techniques. The tail-bite 70 may carry redundant bits in addition to the data payload 68, as a reader 10 may read some amount of data before the start point 60 is recognized. The data sequence may have been preloaded into an encoder in the reader 10, as indicated by the preload 62. The preload 62 may be data that is fed into an encoder such that the states of a data track 58 may be known.

Embodiments in accordance with the present techniques may include additional error correcting schemes or signal enhancement methods to further reduce errors and enhance the reading and signal processing of data sequences in the optical disc 12. For example, a reader 10 may read a data ring 58 for more than one revolution of an optical disc 12. This may reduce symbol distortions and improve the signal to noise ratio (SNR) of the data signal. Circular equalization may use a first read of a data ring 58 as prior knowledge to enhance the signal coming from the data bits to be read. Cyclic redundancy checks (CRC) may also be implemented by generating a CRC and appending the CRC to a data sequence. After the data sequence is decoded, a receiver in the reader 10 may generate a CRC and compare the decoded CRC with the generated CRC to determine whether a data sequence has been properly decoded. Although proper decoding of a data sequence may be improved in circular media decoding, the SNR may further be improved with these techniques, or additional signal enhancing techniques.

Furthermore, in some embodiments, a tail-biting code may also be used for higher order symbols by creating the tail-biting code on more than one track. For example, two adjacent data rings 58 may be read, and bits from adjacent sections of the two adjacent data rings 58 may form a symbol. The symbols formed by more than one data ring 58 may comprise more than one bit. Additionally, two adjacent layers in an optical disc 12 may be read together, and data bits from adjacent sections in the two adjacent layers may also form a symbol. Such embodiments, in accordance with the present techniques, may enable faster reading, as multiple tracks and/or multiple layers of an optical disc 12 may be read. Further, reading multiple tracks and/or multiple layers may be accomplished by one detector, or by more than one detector.

Figure 5:
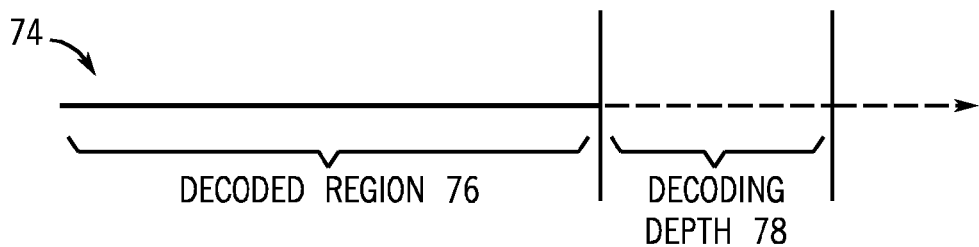
FIGS. 5-7 depict examples of various decoding schemes in reading a data sequence.

Examples of different decoding schemes, and a circular decoding scheme in accordance with embodiments of the present techniques are depicted in FIGS. 5-8. FIG. 5 depicts a first decoding scheme 74 without an ending codeword. A reader may read and decode a data track to obtain a decoded region 76, but the decoding depth 78 may be uncertain. In this first decoding scheme 74, the reader may eventually obtain a desired data sequence after decoding an unknown length of data from a data track.

Figure 6:
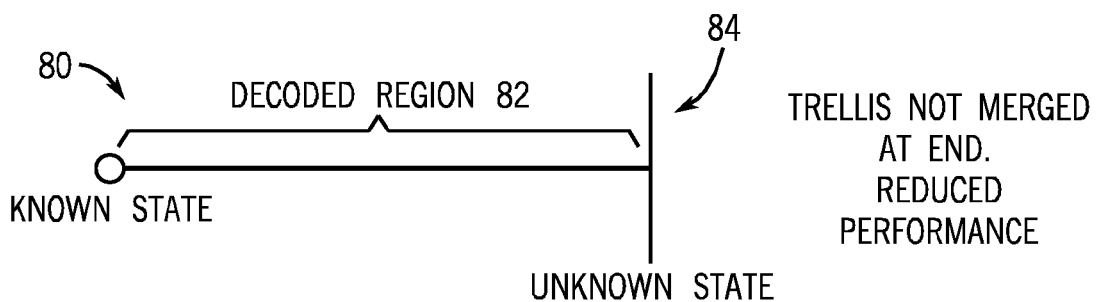

In the second decoding scheme 80 of FIG. 6, the decoded region 82 may be bound by a codeword boundary with a known state, but the data sequence may end at an unknown state 84, and because the states of the starting codeword and the ending codeword are different, the information trellis formed in this second decoding scheme 80 may not be merged. This may result in errors and inefficiencies in the decoding process.

Figure 7:
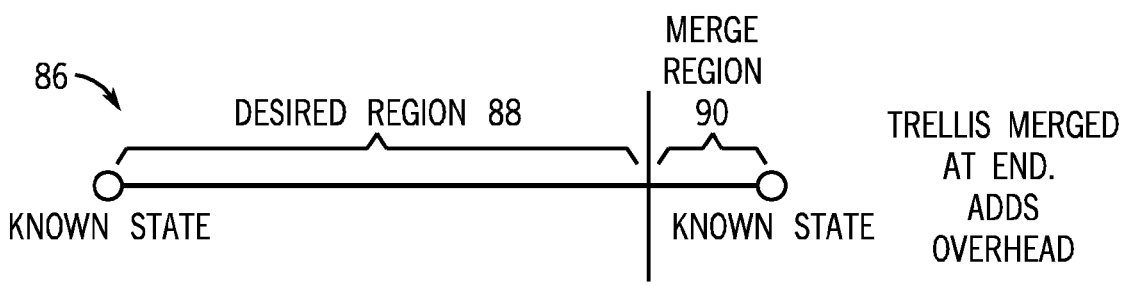

In the third decoding scheme 86 of FIG. 7, the start and end of the data sequence may be surrounded by data bit patterns or additional tail bits, such that a reader may begin reading at a codeword with a known state, and read through the desired region 88 of the data sequence until tail bits are read to indicate that the desired region 88 has ended at another known state, which may be the same state as the state of the initial codeword boundary. Though the trellis formed in this third decoding scheme 86 would be merged, as the states of both the start and the end codewords are the same, a merge region 90 is formed in the trellis. This merge region 90 represents the additional bits added to the end of the data sequence, and these additional bits may decrease data transmission efficiency.

Figure 8:
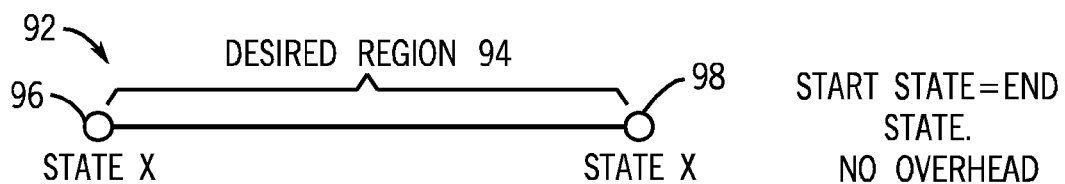
FIG. 8 depicts an example of a circular decoding scheme, in accordance with embodiments of the present techniques.

An example of a circular decoding scheme 92 in accordance with embodiments of the present techniques is depicted in FIG. 8. A reader may begin reading a data ring at any point on the ring, as the start point 96 and the end point 92 may be at substantially the same point. Because the start point 96 and the end point 98 are the same, the start and end of the reading may also have the same state, forming a merged circular trellis when the data ring has been read. Further, because the start and end points 96 and 98 are the same, no additional tail bits or data bits may be required for a reader to identify the bounds of a data sequence or data track. Thus, the desired region 94 contains the target data sequence, and data transmission is not burdened with overhead such as additional patterns, markers, or tail bits.

Figure 9:
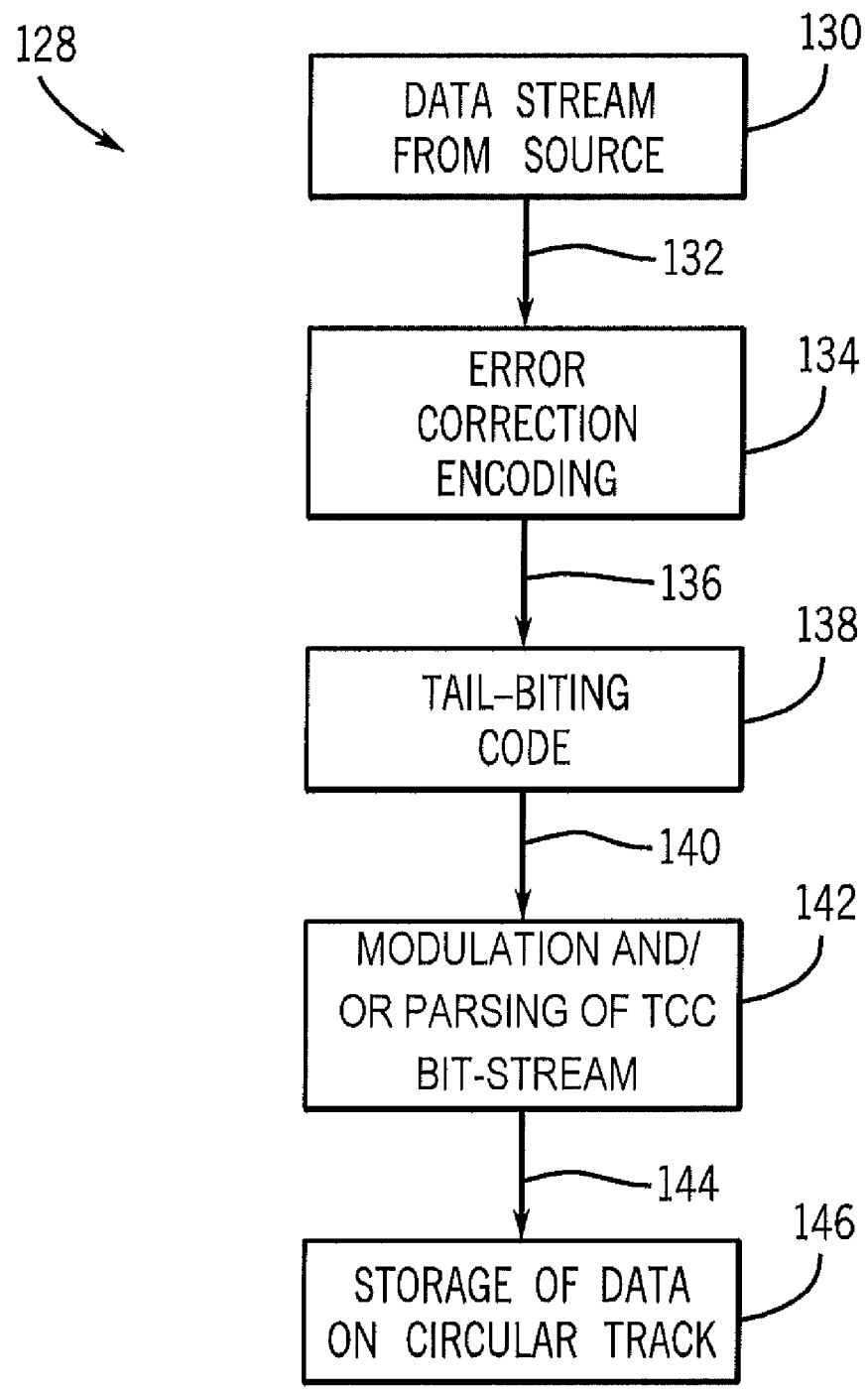
FIG. 9 is a block diagram illustrating a general procedure for storing a bit or bits of data in an optical disc, in accordance with embodiments of the present techniques.

Embodiments in accordance with the present technique may also include a process for storing data in data rings on an optical disc. FIG. 9 depicts a procedure 128 for writing or storing data on an optical disc 12. A data stream to be written may come from a source, as indicated in block 130. The source may be any device associated with the holographic storage system that is capable of generating or sending a signal to write some sequence of data. The data bits of the bit stream 132 may be encoded with error correction code, as indicated in block 134. Examples of error correction code may include, for example, Reed-Solomon encoding, feed-forward systematic codes, recursive systematic codes, Viterbi codes, bit-error rate minimizing code, and the like. The encoded bit stream 136 is then encoded with a tail-biting circular code (TCC), as indicated in block 138. The TCC encoded bit stream 140 is modulated in block 142. Examples of modulation may include eight-to-fourteen modulation (EFM), EFM+, modulation by the 17PP system, used to modulate Blu-Ray discs, or any other modulation suitable for data transmission in optical discs. The modulated bit stream 144 may then be stored in a data ring in an optical disc, as indicated in block 146.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of reading data from a holographic storage disc, comprising:
   reading a sequence of bits from one or more data rings on one or more data layers at different depths for more than one complete revolution of the one or more data rings of the holographic storage disc, wherein a beginning of the sequence may be substantially the same as an ending of the sequence;
   decoding the sequence of bits to form a bit-stream; and
   providing the bit-stream to an output device.

2. The method of claim 1, comprising reading the sequence of bits on the data ring past the beginning of the sequence to enhance a signal to noise ratio of the bit stream.

3. The method of claim 1, wherein decoding the sequence of bits to form a bit-stream comprises:
   analyzing the sequence of bits to remove redundant bits associated with a circular tail-biting code that merges when a reading point reaches the starting point;
   correcting any bit-state errors identified in the sequence of bits from the redundant bits; and
   assembling the corrected sequence bits into the bit-stream.

4. The method of claim 1, wherein providing the bit-stream to the output device comprises processing the bit-stream to form an analog signal and providing the analog signal to an analog output device.

5. The method of claim 1, wherein providing the bit-stream to the output device comprises processing the bit-stream in a digital interface device to form a digital signal and providing the digital signal to a digital output device.

6. A reader for holographic data storage discs, comprising:
   an optical excitation device configured to focus a laser beam on a holographic data storage disc comprising a sequence of bits written in one or more data rings on one or more data layers at different depths, wherein the laser beam reads the sequence of bits for more than one complete revolution of the one or more data rings;
   an optical detector configured to detect reflections of the beam from the sequence of bits and form a signal comprising a bit-stream of the reflections from the sequence of bits;
   a decoder configured to analyze the bit-stream for a circular tail-biting code and assemble a decoded bit-stream from the analyzed bit-stream; and
   an output device configured to provide the decoded bit-stream to an external device.

7. The reader of claim 6, wherein the decoder is configured to analyze the bit-stream for the circular tail-biting code which is encoded on a bit or plurality of bits that is the start and the end of the sequence of bits detected by the optical detector.

8. The reader of claim 6, wherein the decoder is configured to analyze the bit-stream for the circular tail-biting code which comprises a feed forward convolutional code, a recursive convolutional code, a circular code, a circular block code, or a bit-error rate (BER) minimizing code, or any combinations thereof.

9. The reader of claim 6, comprising a demodulator configured to analyze the sequence of bits for a plurality of symbols, and demodulate the symbols to form a demodulated sequence of bits.

10. The reader of claim 9, wherein the demodulator is configured to demodulate the symbols using a maximum a posteriori (MAP) decoder, a wrap-around Viterbi algorithm (WAVA), a bidirectional Viterbi Algorithm (BVA), or any combinations thereof.

11. The reader of claim 6, comprising an error correction decoder configured to:
   identify errors in the decoded bit-stream; and
   correct errors in the decoded bit-stream.

12. The reader of claim 6, comprising an output device configured to convert the decoded bit-stream into an analog signal and provide the analog signal to an analog output device.

13. The reader of claim 6, comprising an output device configured to convert the decoded bit-stream into a digital signal and provide the digital signal to a digital output device.

14. A holographic storage disc, comprising:
   one or more data layers at different depths, wherein the one or more data layers comprises:
      one or more data rings containing optical variations representing data bits, and wherein the data bits in the one or more data rings are encoded with a circular tail-biting code configured to allow decoding of substantially all the data bits in the one or more data rings from approximately one complete revolution of the data ring.

15. The holographic storage disc of claim 14, wherein the optical variations comprise volumetric micro-holographic reflectors located in a data layer.

16. The holographic storage disc of claim 14, wherein the optical variations correspond to pits in a reflective layer.

17. The holographic storage disc of claim 14, wherein the data bits in the data ring are encoded with the circular tail-biting code comprising a feed forward convolutional code, a recursive convolutional code, a circular code, a circular block code, or a bit-error rate (BER) minimizing code, or any combinations thereof.

18. The holographic storage disc of claim 14, wherein the data ring comprises more than one data ring encoded with the circular tail-biting code, such that data bits in more than one data ring represent a symbol.

19. The holographic storage disc of claim 18, wherein the more than one data ring are adjacent data rings on a data layer in the optical storage disc.

20. The holographic storage disc of claim 18, wherein the more than one data ring are on adjacent data layers in the optical storage disc.

21. The holographic storage disc of claim 18, wherein the optical storage disc comprises an arrangement of more than one data rings configured to be read by more than one detector.

22. The holographic storage disc of claim 14, wherein the data ring comprises data bits encoded with an error correction code.

23. The holographic storage disc of claim 14, wherein the data ring comprises data bits configured to be modulated to substantially protect the data bits from interference from imperfections on the surface of the data disc.

24. The holographic storage disc of claim 15, wherein the data ring comprises data bits represented by symbols selected from a group of symbols.

25. The holographic storage disc of claim 14, wherein the data ring comprises a starting point of the one complete revolution, wherein the starting point is substantially the same position on the data ring as an ending point of the one complete revolution.

26. A method for storing data on a holographic data disc, comprising:
   encoding a bit sequence with a tail-biting circular code (TCC) to form a TCC data stream;
   parsing the TCC data stream into separate bit patterns of equal length;
   selecting symbols based on the bit patterns; and
   storing the symbols in one or more data rings on one or more data layers at different depths of the holographic data disc.

27. The method of claim 26, comprising
   encoding a digital data stream from a data source using an error correction code to form the bit sequence.

28. The method of claim 26, wherein the tail-biting circular code (TCC) comprises a feed forward convolutional code, a recursive convolutional code, a circular code, a circular block code, or a bit-error rate (BER) minimizing code, or any combinations thereof.

* * * * *